United States Patent [19]

Bourrie et al.

[11] 4,111,473
[45] Sep. 5, 1978

[54] BOX OPENING DEVICE

[75] Inventors: Georges Bourrie, Neuilly-sur-Seine; Robert Lensel, Bourg la Reine, both of France

[73] Assignee: R. Alkan & Cie, Valenton, France

[21] Appl. No.: 797,714

[22] Filed: May 17, 1977

[30] Foreign Application Priority Data

Jul. 23, 1976 [FR] France ............................ 76 22636
Mar. 11, 1977 [FR] France ............................ 77 07334

[51] Int. Cl.$^2$ ............................................. E05C 3/30
[52] U.S. Cl. .............................. 292/126; 292/201
[58] Field of Search ......... 292/201, 126, 226, 129, 292/229

[56] References Cited

U.S. PATENT DOCUMENTS

| | | | |
|---|---|---|---|
| 1,007,398 | 10/1911 | Snider | 292/129 |
| 2,477,472 | 7/1949 | Wright | 292/DIG. 49 |
| 3,325,203 | 6/1967 | Moler | 292/201 |
| 3,359,767 | 12/1967 | Arlauskos et al. | 292/201 X |

*Primary Examiner*—Richard E. Moore
*Attorney, Agent, or Firm*—William Anthony Drucker

[57] ABSTRACT

This device for locking the door of an enclosure notably for housing safety equipments on aircraft or the like comprises means permitting of opening notwithstanding the additional load resulting from the use of a stronger opening spring than in hitherto known devices of this character, without modifying the external shape and dimensions of the device nor increasing the consumption of electric current for energizing the means provided for releasing the device to its open condition, whereby the device remains completely interchangeable with prior art devices not provided with the complemental features of this invention, consisting essentially in the use of a coil spring having several arms and possibly also of an intermediate lever for increasing the lever advantage of hitherto known single-lever devices.

6 Claims, 12 Drawing Figures

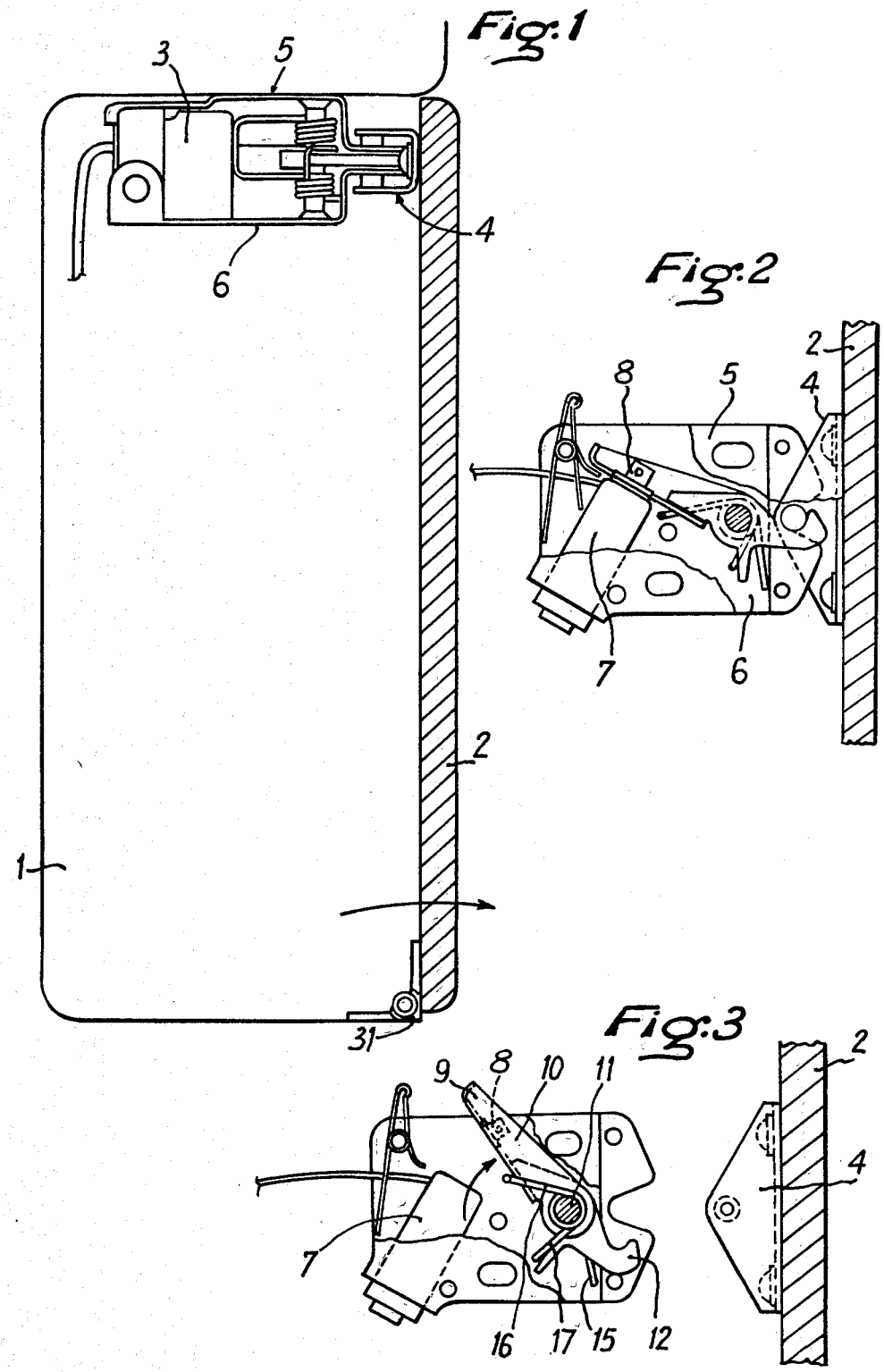

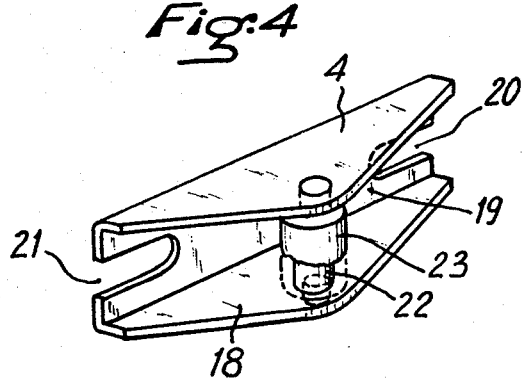
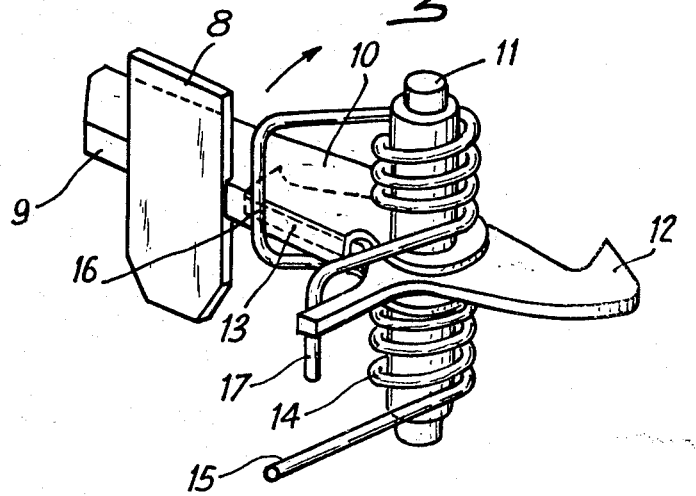
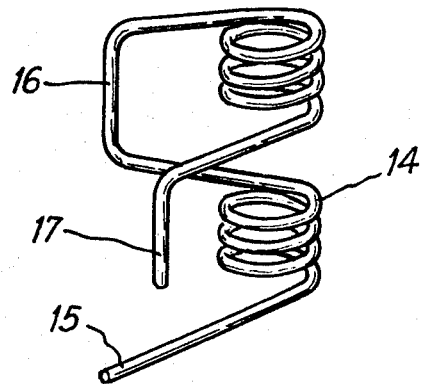

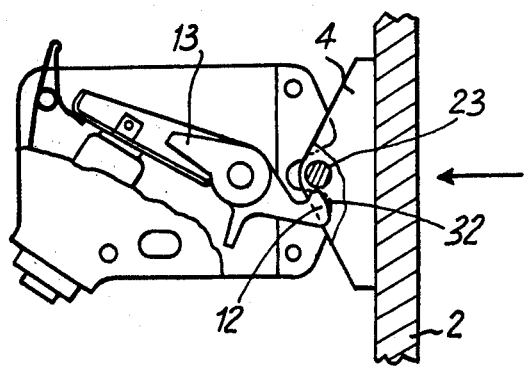
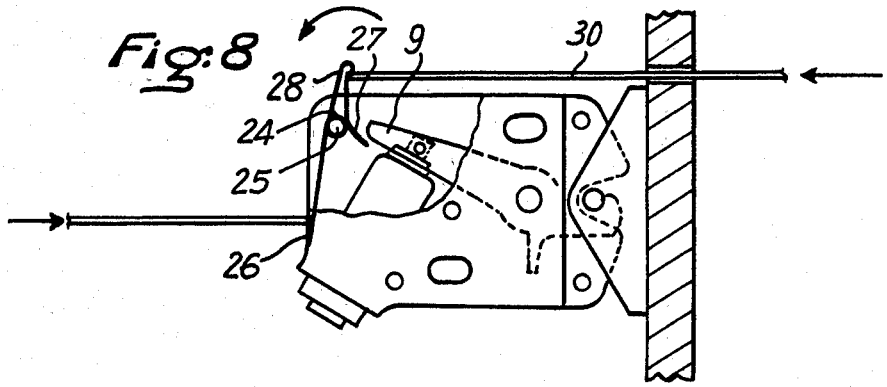
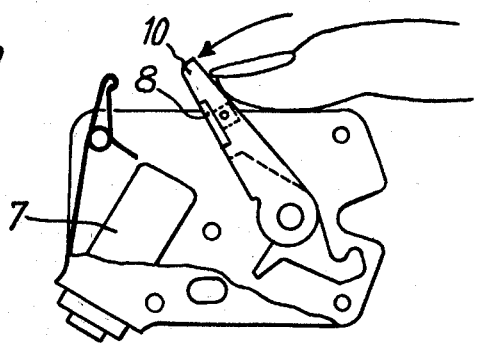
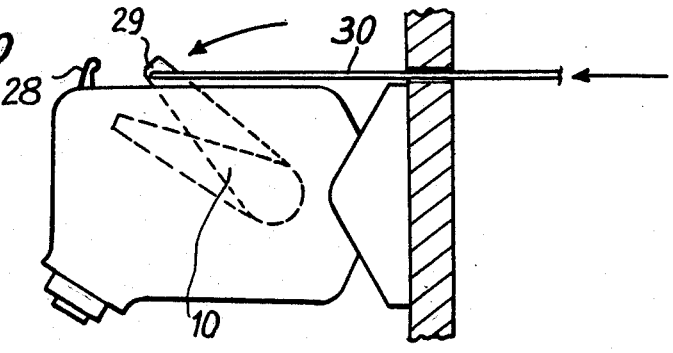

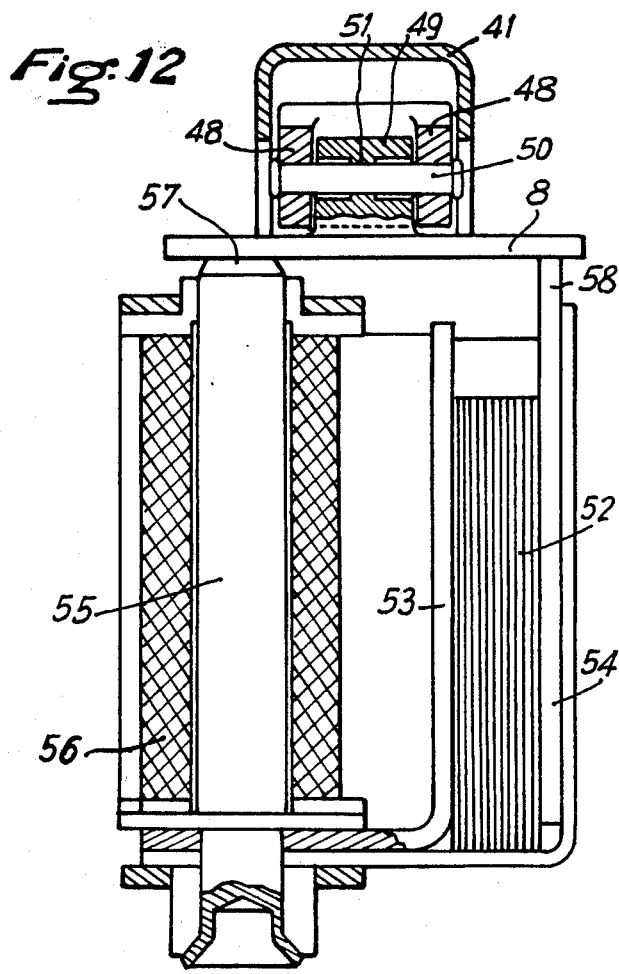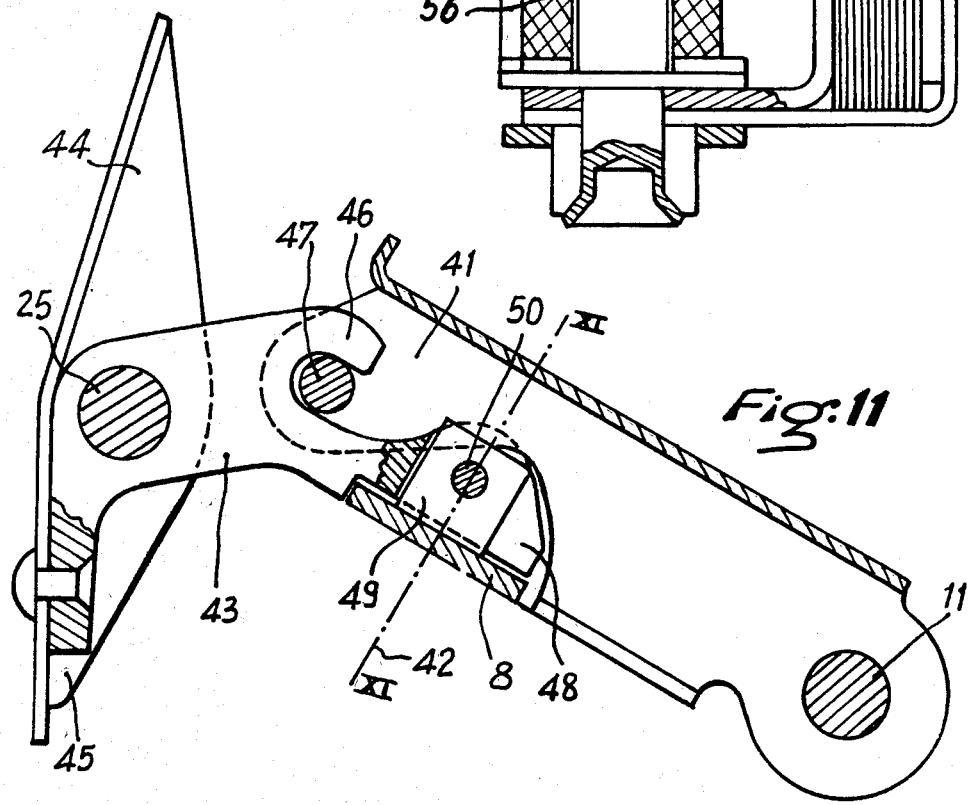

BOX OPENING DEVICE

BACKGROUND OF THE INVENTION

1. Field of the Invention

The present invention relates to an electro-mechanical door lock opening device, with means permitting the manual opening and closing of doors of boxes containing safety equipments or apparatus on aircrafts, such as boxes containing inhalers and possibly oxygen generators.

2. Description of the Prior Art

Devices intended for the same general purpose have already been disclosed in the U.S. Pat. Nos. 3,753,316 and 3,942,828 and in the U.S. Patent application No. 708,819 filed on July 26, 1976 in the name of the same Applicants.

The devices disclosed in the above-mentioned patents and application correspond to various and different conditions of the equipment as defined by the relevant official rules or specifications.

SUMMARY OF THE INVENTION

The present invention is directed to meet requirements affording a simplified construction of the device by eliminating the ball and piston locking mechanism while maintaining in combination various advantageous features of the different devices described and illustrated in the above-mentioned patents and application. More particularly, the device is maintained in its closed condition by utilizing the force exerted by a fixed permanent magnet on a small plate of a lock, the automatic opening under the force of spring means occurring as a consequence of an electro-magnetic triggering action releasing the lock from the magnetic pull while minimizing the current consumption necessary therefore. Moreover, the door is reclosed by the adherence of the small plate of the locking device to the magnet and also by pushing the door so as to cause the locking engagement of a movable hook or hooking catch of the locking device. Finally, manual opening by authorized personnel is possible in case of emergency.

In fact, the hook or hooking catch is so mounted that pulling the door in the opening direction will not apply to the hooking catch a resultant force likely to pivot same to its door opening position, the efforts thus made only increasing the frictional forces to be overcome by the hook release spring during the opening trigger action, so that said hook may be associated with an opening spring producing a relatively high thrust, and the retaining force resulting from the pull exerted by the magnet on the hook must be increased.

In view of the foregoing, it is another object of the present invention to provide a device having complementary characteristics and capable of opening the door notwithstanding an overload making it necessary to provide a stronger hook opening spring without changing the external shape of the device nor increasing the electric power necessary for triggering the device to its open position, this device remaining therefore completely interchangeable with any device not provided with these complementary features.

The above-described and desired result is obtained by causing the magnet to exert its pull or magnetic attraction on a plate which, instead of being carried by the tail portion of the hook as in a first embodiment, is carried by an intermediate pivoting lever engaging said tail portion at a point located on said lever nearer to its fulcrum than the axis of the action exerted by the magnet, and located on said tail portion at a point more remote from the hook fulcrum than the axis of action of the magnet, said intermediate lever being also adapted to act as a manual control lever.

Therefore, the magnet actuates the hook tail portion by means of the intermediate lever but the latter transmits to the hook tail portion an increased force since the lever arm acting upon the hook tail portion is reduced, and since this increased force is exerted on the hook at a greater distance from the hook fulcrum, the retaining torque exerted on the hook tail portion is increased by a double leverage, so that the same magnet is capable of retaining the hook even when the latter is urged by its spring with a stronger opening force.

BRIEF DESCRIPTION OF THE DRAWINGS

FIG. 1 is a side elevational and part-sectional view of the device according to the present invention, shown in its door locking position;

FIG. 2 is a corresponding plan view of the device of FIG. 1; FIG. 3 is a view similar to FIG. 2 but showing the device in its door opening position;

FIG. 4 is a perspective view of the lock staple secured to the door;

FIG. 5 illustrates also in perspective view the compound hook comprising the pivoted nose and a tail portion associated with a rocking magnetic plate adapted to be attracted by a magnet;

FIG. 6 illustrates in perspective view the particular configuration of the lock spring with its various operative arms;

FIG. 7 is a detail view showing the pivoted hook nose retracted by the action exerted by the door lock staple against the spring controlling the opening of the compound hook;

FIG. 8 shows the manual opening control lever and the two manners in which the opening can be controlled, both from inside and from outside the door;

FIGS. 9 and 10 show the recocking of the lock after the door has been opened completely or ajar;

FIG. 11 illustrates diagrammatically the tail portion of the pivoted hook and the intermediate lever acting as a manual control lever according to a modified form of embodiment providing an increased lock retaining torque, the Figure being a fragmentary section taken along a plane perpendicular to the axes of the pivot pins of said hook and of the intermediate lever which are parallel to each other, and FIG. 12 is a section taken along the line XI—XI of FIG. 11, showing the permanent magnet-cum-solenoid retaining device.

DESCRIPTION OF THE PREFERRED EMBODIMENTS

FIGS. 1, 2 and 3 of the drawings depict the enclosure 1 containing the apparatus or equipments (not shown) to be protected and provided with the device 3 of this invention which is shown diagrammatically together with the door 2 to which the lock staple 4 and a door opening spring 31 are secured. Between the wings 5 and 6 of the device 3 there is mounted a known permanent magnet device 7 completed by a trigger or release control solenoid as described in the above-mentioned U.S. patent application No. 708,819. The function of permanent magnet 7 is to attract and retain in its attracted position the rocking plate 8 secured to the tail portion 9 of the compound hook 10 fulcrumed to a cylindrical fixed shaft 11 rigid with wings 5 and 6. The nose 12 of hook 10 is also pivoted to shaft 11 and comprises a heel 13 acting as a stop member limiting the closing movement of nose 12 in relation to said tail portion 9. A double coil spring 14 specially designed for the purposes of the present invention, as will be explained presently, reacts with one end arm 15 against the frame of device 3 and has the dual function of urging the compound hook 10 to its lock opening position in the direction of the arrow (FIG. 5) through the action exerted by its intermediate portion 16, and holding the nose 12 in its lock closing position in relation to the tail portion 9 of hook 10 through the action of its other end arm 17 while permitting the resilient retraction of this nose 12 when closing the door 2.

In FIG. 4 the lock staple secured to the door is shown separately as comprising, in this specific form of embodiment, a U-shaped strap 18 of relatively thin sheet metal. The bottom or central portion of U-shaped strap 18 has two opposite notches 20 and 21 formed therein to permit the adjustable fastening of the lock staple 4 to the door. The U-shaped strap 18 is provided with a cross pin 22 riveted on its side wings and adapted to act as a pivot member to a small tubular member 23 of relatively hard material, concentric to said pivot pin 22, in order to reduce frictional contacts with the co-acting nose 12.

FIG. 5 also illustrates in perspective view the compound hook assembly 10 in order to afford a clearer understanding of its construction and also of the dual function devolved to spring 14.

FIG. 6 shows in detail this spring 14 comprising on each side of its intermediate portion 16 two series of turns or coils surrounding the pivot pin 22.

FIG. 7 illustrates in fragmentary view the position of some component elements of the device during the closing and locking movement of door 2, the lock staple 4 acting through the medium of the rotating tube 23 upon the nose 12 for rapidly locking the door.

In FIG. 8, there is shown in plan view an element 24 constituting a three-armed lever fulcrumed to a cylindrical cross member 25 riveted to the wings 5 and 6 of the device 3. A first arm 26 of this lever 24 is adapted to be moved to the right, as seen in the Figure; another arm 27 extending within the device underlies the end 9 of compound hook 10 and finally a third arm 28 is adapted to be moved to the left, as seen in the Figure.

FIGS. 9 and 10 illustrate the recocking of the door lock after a complete or very reduced opening of the door. In the first case, the operator recocks the lock by depressing with his forefinger the composite hook 10 which is thus held against movement as a consequence of the sticking of its rocking plate 8 attracted by the magnetic device 7. In the second case, the lock is recocked by inserting a needle 30 through an orifice formed for this purpose through the door (this orifice being also useful for manually triggering or releasing the device by using the same means for pushing the arm 28 of lever 24); the end of needle 30 engages the end projection 29 carried by the tail portion 9 of the compound hook 10 so that by pushing the needle the hook 10 is caused to pivot under the same conditions as when depressing it with a finger as described hereinabove.

The above described device operates as follows:

The door 2 normally urged to its open or ajar condition by spring 31 is retained in its closed position by the snap engagement of its staple 4 into the nose 12 of compound hook 10 so that the force exerted by pivot pin 22 via tube 23 on the nose 12 is directed through the axis of rotation 11 of said nose. The moment of this force is therefore zero in relation to this axis and the only function of magnetic device 7 is to keep the tail portion 9 of hook 10 against the force of spring 14 which is directed in the hook-opening direction. This spring is so calibrated that it can overcome the frictional retarding forces exerted around pivot pin 11 and on nose 12 when the latter is released from lock staple 4, this friction resulting from the effort required for opening the door 2, as a consequence of possible accelarations and also from the force of door spring 31. Therefore, the lock spring 14 has a relatively reduced force and only a very moderate electric energizing current is sufficient in the coil of the solenoid of magnetic device 7 for reducing the sticking or adherence of tail portion 9 to a value below that required for keeping this tail portion in its adherent position. Thus, the complete hook 10 is caused to pivot about the cross member 11 by the spring 14, the nose 12 is released from staple 4 and the door 2 is eventually released to its open condition.

Initially or for another use, the electric current supply is cut off and the hook is brought back to its adherent position with plate 8 engaging the permanent magnet of magnetic device 7. Thus, the door 2 can be reclosed, the rotating tube 23 engaging the oblique portion 32 of nose 12 to cause the latter to pivot about its pivot pin 11 against the force exerted by the end arm 17 of spring 14 until the nose engages the tube 23 of staple 4. During this phase and as shown in FIG. 7, the heel 13 of the nose 12 moves away from tail portion 9 and resumes its position of abutment when the nose 12 is fully engaged on tube 23 (see FIG. 2).

The two functions comprising the opening of the hook assembly, on the one hand, and the resilient retraction of the hook nose, on the other hand, are accomplished as mentioned in the foregoing by the same spring 14 illustrated in FIG. 6. This spring, wound in a particular manner, comprises two end arms of which one arm 15 reacts against the fixed frame structure of the device and the other arm 17 co-acts with a projection of nose 12 and an intermediate portion 16 controlling the tail portion 9 of hook 10 in the opening direction.

As already explained in the various patents and patent application mentioned in the preamble of this specification, it may be necessary under certain circumstances to open the door without using any electric current supply, by acting in a discrete manner either from the door side or from the box side. For this purpose, a three-armed lever 24 fulcrumed to a pivot pin 25, as illustrated in FIG. 8, is provided. One arm 27 is adapted to engage and control the tail portion 9 of hook 10 in order to separate the latter from the magnetic device 7. Another arm 26 may be actuated from the box side and finally the arm 28 may be actuated from the door side by means of a needle 30 kept in the exclusive custody of an authorized member of the crew or personnel. In certain specific cases, for example when a general checking of the boxes housed within the ceilings of the passenger compartment is required while limiting the door opening movement, it is not possible to have a direct access for restoring the adhered condition of the tail portion of hook 10. To avoid this inconvenience, the assembly is so arranged that said needle 30 can also be used for recocking the device, that is, for restoring the plate 8 of the tail portion 9 of the device to its position of engagement with the magnetic device 7, by inserting the needle 30 through the same orifice as that used for the manual opening. As illustrated in FIG. 10, a shoulder or like projection 29 is formed at the end of tail portion 9 and adapted to be engaged by the point of needle 30 so that a simple thrust with this needle will restore the tail portion 9 to its adhered condition.

Now reference will be made to FIGS. 11 and 12 showing a modified form of embodiment designed for increasing the torque holding the lock in its closed position.

In FIGS. 11 and 12 the tail portion 41 of the compound hook is fulcrumed to pivot pin 11 constituting also in this embodiment the hook pivot means and this tail portion 41 is substituted for the tail portion 9 of the preceding embodiment. The retaining magnet may be similar to the one described hereinabove and may be disposed in the same manner; however, only its axis or fulcrum 42 is shown in FIG. 11, the reference numeral 8 designating the rocking plate adapted to be attracted by the magnet; furthermore, this plate 8 which, in all FIGS. 1 to 11 of the drawings, was fastened to the tail portion 9 of hook 10, is now secured near the end of one arm 43 of an intermediate lever, for example the manual control lever fulcrumed to pivot pin 25 and comprising in addition an upper arm 44 and a lower arm 45 adapted to be actuated manually in two different ways, as already explained in the foregoing.

The arm 43 corresponding to arm 27 of FIG. 8 comprises intermediate its ends a hook-like portion 46 engaged by a cross member 47 rigid with the tail portion 41 of the compound hook, this cross member 47 being disposed at a greater distance from pivot pin 11 than the axis 42, the hook-shaped portion 46 being nearer to pivot pin 25 than the axis 42.

With this modified arrangement, it is clear that the tail portion 41 is not retained directly by the permanent magnet fulcrumed at 42, this magnet exerting through the rocking plate 8 a torque on the intermediate lever whereby the cross member 47 receives a force greater than the pull exerted by the magnet since it is multiplied by the ratio of the lever arms, in relation to pivot pin 25, of the force applied to this intermediate lever to the force received by this intermediate lever. The force thus transmitted exerts on the tail portion 41 of the hook a torque proportional to the lever arm pivot pin 47 in relation to the pivot pin 11 of the hook proper, this lever arm being itself greater than the distance from axis 42 to pivot pin 11 so that the retaining torque applied to tail portion 41 is further increased in comparison with the value it would have if a force equal to that exerted on the cross member of said tail portion were applied to the letter at the level of the magnet axis 42.

Finally, as a result the modified arrangement illustrated in FIGS. 11 and 12 produces a retaining torque increased by the double lever advantage of the ratio of lever arms of fulcrum 42 and cross member 47 around pivot pin 25, and of the ratio of the distances between cross member 47 and fulcrum 42 to the pivot pin 11 of the compound hook.

With this double lever advantage the device according to this modified embodiment of the invention is adapted, given a same pull exerted by the permanent magnet, to withstand considerably increased door opening forces, in any case greater than those initially contemplated in the total ratio of the double lever advantage, without modifying the amount of electric power necessary for reducing the unchanged adherent force to a degree sufficient to permit the triggering. Moreover, the external configuration of the device remains unchanged, so that this improved device remains completely interchangeable with the one described hereinabove with reference to FIGS. 1 to 10.

FIG. 12 illustrates the permanent magnet-cum-solenoid retaining device according to this modified embodiment. In this figure the tail portion 41 of the compound hook has an U-shaped cross section enclosing the end of arm 43 of the aforesaid three-armed lever, the two wings of said tail portion 41 being interconnected by a cross member 47 adjacent the outer end of said tail portion 41. At the level of axis 42 illustrated in FIG. 11 the lever arm 43 has a strap-shaped portion having two lateral wings 48 between is a block 49 rigid with plate 8 and connected via a pivot pin 50 to said arm 43, thus providing a pivotal mounting for said plate 8. This pivot pin 50 extends through, and is solid with, the pair of opposite wings 48, and extends through a relatively narrow central bearing portion 51 of the bore formed in block 49 whereby, by providing a slight clearance, the plate 8 is allowed to oscillate transversely. This arrangement, constituting a kind of simplified universal joint, is well known per se and therefore no part of the present invention.

FIG. 12 designates at 52 the permanent magnet disposed between a pair of soft-iron armatures 53, 54 and at 55 the soft-iron core surrounded by the solenoid coil 56. The magnetic retaining poles are designated by reference numerals 57 and 58 at the ends of core 55 and armature 54, respectively, which face the plate 8 and are engaged by this plate 8 in the adhered condition thereof. As already explained in the foregoing, supplying a low direct current voltage to the solenoid in the proper direction is sufficient for reducing magnetic pull exerted on plate 8 and thus permit the opening of the compound hook responsive to the door opening spring (such as 31 in FIG. 1).

Of course, various modifications and changes may be brought to the forms of embodiment of the invention shown and illustrated herein, without inasmuch departing from the basic principles of the invention as set forth in the appended claims, as those skilled in the art will readily understand.

What is claimed as new is:

1. An electro-mechanical locking device, for keeping in a closed position the door of a box such as a box for safety equipment on an aircraft and permitting the automatic and manual opening of said door, said device comprising:-
   (i) a lock staple secured at an inner face of the door and provided with a cross pin,
   (ii) a compound hook disposed within said box and comprising a U-shaped tail element having an intermediate wall to an outer face of which is secured a metal plate, said tail element being pivotable about a pivot pin, and
   (iii) a nose element disposed within said tail element and pivotable with respect thereto about said pivot pin, said nose element having a first end portion abutting against an inner face of said intermediate wall to be positively moved thereby when said tail element rotates about the pivot pin in a direction for opening of the compound hook, said nose element having a second curved end portion adapted to engage said cross pin of the lock staple,
   (iv) a magnet disposed within the box and adapted to co-act with said plate provided on the tail element of the hook to maintain said hook in the closed position, (v) a spring coiled around said pivot pin and having a first arm engaging said tail element to urge said hook toward an open position and a second arm engaging said nose element to urge said first end thereof against said intermediate wall of the tail element, whereby the force exerted by said first arm of the spring, when the force exerted by the magnet on the metal plate becomes lower than a predetermined value, ensures a rotation as a unit of the compound hook to open the box door, whereas with the door open and the hook being returned to its closure position in which the action of the magnet retains the compound hook, the closure of the box door is permitted by rotation of the nose element against the action of said second arm of the spring.

2. An electro-mechanical locking device, according to claim 1, comprising a pin on the box, a lever pivotable about said pin, said lever having a first arm disposed in front of an opening of an inner wall of the box to allow the passage of a push rod adapted to rotate said lever in a given direction, a second arm disposed in front of an opening of the box door to allow the passage of a push rod adapted to rotate said lever in said given direction, and a third arm disposed in the vicinity of the magnet and adapted, when said metal plate co-acts with the magnet and when the lever is rotated in the given direction, to engage said metal plate for separating it from the magnet, thus permitting manual control of the door opening.

3. A device as recited in claim 1, wherein said magnet for retaining said compound lock hook in its locking position is associated with an intermediate lever, the arrangement being such that said intermediate lever is adapted to transmit to said tail portion the retaining force at a point located nearer to the fulcrum of said intermediate lever than the axis of said magnet and farther from the fulcrum of said main hook than said axis of the magnet, whereby the magnetic retaining torque exerted on said main hook has a double lever advantage in comparison to the lever advantage that would be exerted directly on said hook tail portion for a same position of, and a same magnetic pull exerted by, said magnet.

4. A device as recited in claim 3, wherein said intermediate lever is also adapted to be operated as a manual control lever comprising, in addition to said arm co-acting with said hook and responsive to said magnet, two other, substantially opposite, arms on which manually controlled actions can be exerted in opposite directions for moving said intermediate lever in the direction to open said hook.

5. A device as recited in claim 4, wherein the arm of said intermediate lever adapted to co-act with said locking hook carries adjacent its outer and a rocking plate adapted to be attracted by said magnet and intermediate its ends a hook-shaped portion adapted to retain the tail portion of said main hook with a high lever ratio, the retaining force thus exerted on said main hook as a consequence of the thus multiplied force being further increased by the particular position of the point of action of the intermediate lever on said tail portion of said main hook.

6. A device as recited in claim 5, wherein said lever ratio is of the order of 2 : 1.

* * * * *